United States Patent [19]
Hollweck et al.

[11] 3,821,682
[45] June 28, 1974

[54] THERMOSTAT, PARTICULARLY FOR ROOM TEMPERATURE CONTROL

[75] Inventors: Walter Hollweck, Nurnberg; Leonhard Nadler, Bad Kissingen, both of Germany

[73] Assignee: Inter Control Hermann Kohler Elektrik GmbH & Co. KG, Nurnberg, Germany

[22] Filed: Apr. 20, 1973

[21] Appl. No.: 353,112

[30] Foreign Application Priority Data
Apr. 20, 1972  Germany............................ 2219451

[52] U.S. Cl. ............................................. 337/380
[51] Int. Cl. ............................................. H01h 37/04
[58] Field of Search .......... 337/112, 360, 361, 362, 337/334, 333, 380, 381

[56] References Cited
UNITED STATES PATENTS
2,890,311   6/1959   Lehr .................................. 337/360
3,668,594   6/1972   Kulick ............................... 337/380

Primary Examiner—Roy N. Envall, Jr.
Attorney, Agent, or Firm—Spencer & Kaye

[57] ABSTRACT

A thermostat which includes a bimetallic temperature sensor, a device connected to the sensor for setting a desired temperature value and an electric switch actuated by the sensor, has a housing which includes a frontal wall formed by a highly heat conducting front plate that extends in the close vicinity of the sensor disposed in the housing and/or includes a partition which separates the sensor and the electric switch from one another and which extends within the housing spaced from and substantially parallel to the frontal side of the housing.

13 Claims, 2 Drawing Figures

PATENTED JUN 28 1974 3,821,682

THERMOSTAT, PARTICULARLY FOR ROOM TEMPERATURE CONTROL

BACKGROUND OF THE INVENTION

This invention relates to a thermostat, particularly for room temperature control, having a housing, a bimetallic temperature sensor, a temperature setting device connected to the temperature sensor and an electric switch actuated by the temperature sensor.

Thermostats of the aforeoutlined type are widely used with heating systems. They activate the heating system by closing an electric switch of an electric circuit by means of the bimetallic temperature sensor when the room temperature falls below the desired temperature value set at the bimetallic temperature sensor by the temperature setting device. If the heat supplied by the thus activated heating system raises the room temperature to the desired temperature value then the electric switch is opened by virtue of the expansion of the bimetallic temperature sensor, whereupon the heating system is deactivated. In this manner it is possible to control the room temperature in the range of the set desired value.

In order to accomplish the desired control of the room temperature in the range of the set desired value, it is necessary that the temperature sensor itself has the same temperature as the room air. This means that, for example, the interfering effect of the cooler wall masonry has to be eliminated. In practice this desideratum is generally accomplished by mounting the thermostat on plaster to ensure the greatest possible distance between the temperature sensor and the wall masonry. To mount the thermostat in this manner is, however, generally undesirable from the aesthetic point of view since its dimensions are too large and thus constitute an immediately noticeable eyesore compared to the other usually flat, inconspicuous electric actuating devices. To eliminate this disadvantage, thermostats have been developed which are designed to be mounted in a junction box situated behind the plaster. Thermostats which are designed to be mounted in such a manner are, however, unsatisfactory, because the interfering influence of the masonry cannot be sufficiently neutralized due to the proximity between the temperature sensor and the masonry and further in order to achieve an acceptable compromise, complicated measures have to be taken for guiding the room air through the lid of the thermostat and for disposing the temperature sensor externally of the masonry. It is a further disadvantage of thermostats known heretofore that they have to be taken apart at the site of use to connect them to the electric circuit of the heating system. This may result in the soiling of the mechanism and the loss of components.

It is an object of the invention to provide an improved thermostat of the aforeoutlined type which is free from the above-discussed disadvantages.

It is a further object of the invention to provide an improved thermostat adapted to be mounted in a junction box.

It is also an object of the invention to provide an improved thermostat in which the rapid transfer of room temperature to the temperature sensor is enhanced.

It is still another object of the invention to provide an improved thermostat in which the electrical and non-electrical components are spatially separated from one another.

SUMMARY OF THE INVENTION

These and other objects to become apparent as the specification progresses are accomplished according to the invention wherein, briefly stated, the thermostat housing has a front plate which is made of a material of very good heat conductivity and the bimetallic temperature sensor is disposed within the housing in a close vicinity of the front plate. According to the invention, the thermostat housing includes an internally extending partition that separates from one another the temperature sensor and the electric switch actuated thereby.

The thermostat designed according to the invention is very advantageous since the arrangement of the bimetallic strip in the close vicinity of the heat conducting front plate makes possible, on the one hand, an excellent transfer of the room temperature to the temperature sensor and permits, on the other hand, a substantially flat structural design. Further, the provision of the partition increases the safety factor of the thermostat since the electric and non-electric components are positively separated from one another and also, the bimetallic temperature sensor is effectively protected against accidental contact or damage.

DESCRIPTION OF THE PREFERRED EMBODIMENTS

Figure 1:
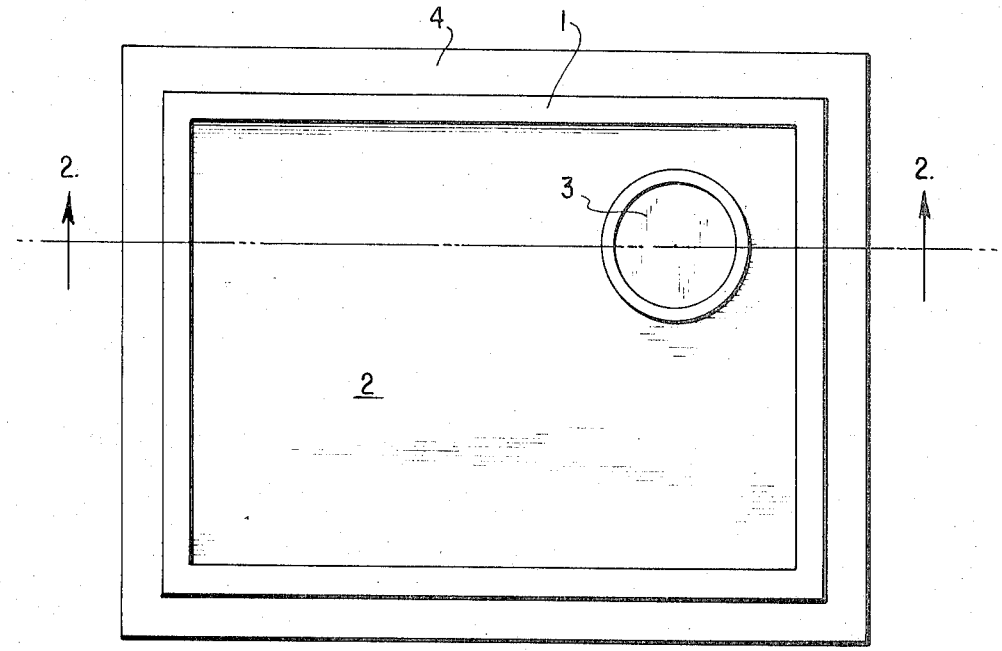
FIG. 1 is a side elevational view of the preferred embodiment of the invention.

Turning now to FIG. 1, the thermostat according to the invention is designed as a rectangular device having a housing 1 which, for the purpose of eliminating a temperature interference by, for example, the wall masonry, is made of a heat insulating synthetic material. The housing 1 is closed at its frontal side by a front plate 2 made of a material of good heat conductivity, preferably aluminum. It is to be understood, however, that the heat conducting material may be copper or an alloy, etc. For enhancing the heat transfer across the front plate 2, the latter preferably has a very small thickness. This is not opposed by structural requirements, since the front plate 2 has only a covering and a heat conducting function and is thus not exposed to any stresses. The front plate 2 may be secured to the housing 1 by snapping it into two opposite grooves in the housing wall, or by means of securing screws or any other fastening device.

Before the front plate 2, externally of the housing 1, there is disposed a rotatable knob 3 of a conventional mechanism for setting the desired temperature value. It is to be understood that instead of a rotating setting device a sliding mechanism may be used. Expediently, the front plate 2 may have an opening for the knob 3 for ensuring a simple removal of the front plate 2 from the housing 1. The latter is disposed in a closure frame 4 for mounting it on a wall.

Figure 2:
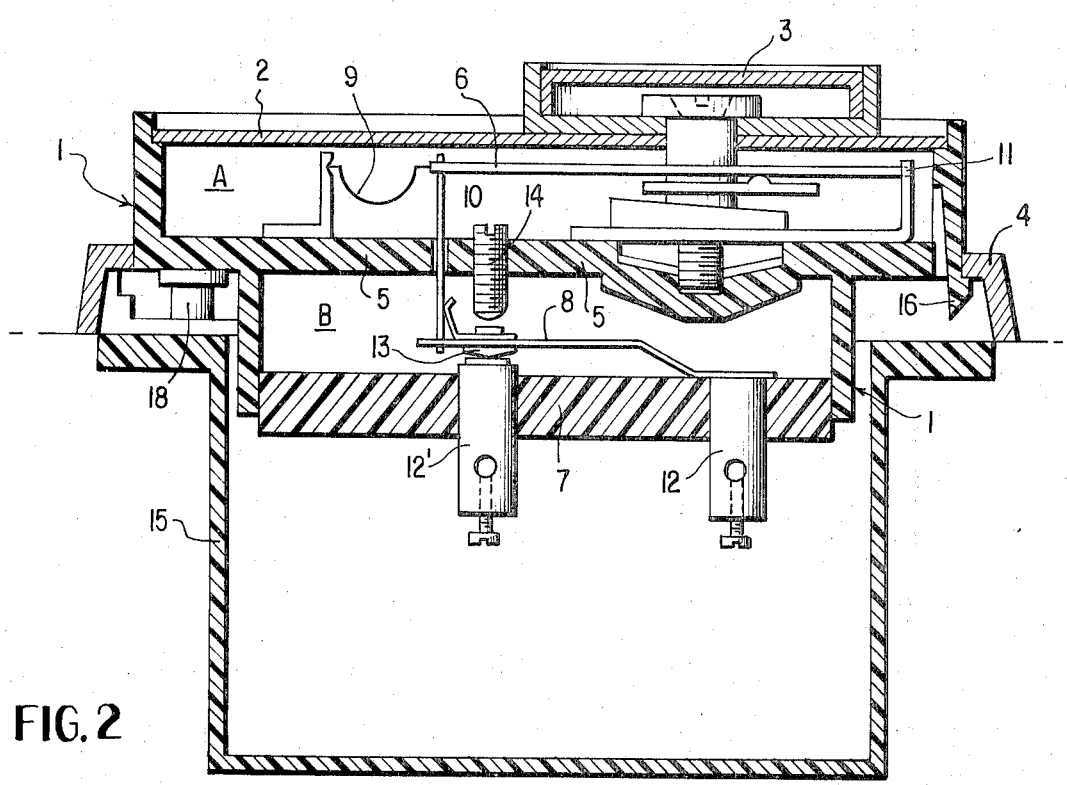
FIG. 2 is a sectional plan view taken along line 1—1 of FIG. 1.

Turning now to FIG. 2, the housing 1 is divided by means of a partition 5, extending parallel to the front plate 2, into two housing zones A and B. In the housing zone A between the partition 5 and the front plate 2 there are disposed a largesurface bimetallic temperature sensor 6 and the desired temperature setting mechanism operated by the knob 3 and in the housing zone B between the partition 5 and rear wall 7 there is situated an electric on-off switch including a movable contact spring 8. The bimetallic temperature sensor 6 is attached indirectly to the housing 1 at 11 and is biased by means of a spreading spring 9. The latter has one end which engages a bracket integral with the housing 1 and another end which is connected with the temperature sensor 6. The provision of the partition 5 according to the invention, and thus the compartmentalization of the housing 1 substantially increases the safety factor of the thermostat, since the non-electric components, such as the bimetallic temperature sensor 6 which are accessible from the outside in the absence of the front plate 2 (for example, upon unauthorized removal thereof), are physically separated by an electrically insulating wall from all the electric components, such as the switch 8, 13. It is noted that this compartmentalization is a feature of the invention that is provided independently from the heat-conducting properties of the front plate 2.

A bar 10 made of an electrically insulating material extends through an opening in the partition 5 and connects the bimetallic temperature sensor 6 with the contact spring 8. In this manner a mechanical actuation of the elecric switch by the sensor 6 is accomplished. In the rear wall 7 there are held terminal posts 12 and 12' which project outwardly of the housing 1 for receiving electric conductors of a circuit for the control of the heating system. That end of the termianl 12 which is within the housing zone B is affixed to the stationary end of the contact spring 8, while that end of the terminal 12' which is situated within the housing zone B is formed as a stationary contact cooperating with the movable contact 13 secured to the contact spring 8. The provision of the rear wall 7 which closes the housing 1 in the back and which has outwardly projecting terminal posts is very advantageous, since during the mounting of the thermostat, when the latter is connected to the circuit of the heating system, a dismantling of the thermostat is unnecessary. Consequently, on the one hand, a very rapid mounting of the thermostat is possible and, on the other hand, the danger of a loss, damage or soiling of the components is securely eliminated. In the partition 5 there is held a setscrew 14 for limiting the excursion of the contact spring 8.

In the embodiment illustrated in FIG. 2, the large-surface bimetallic temperature sensor 6 is disposed very close (preferably about 1-2 mm) to the front plate 2. Advantageously, the area of the bimetallic temperature sensor 6 is about one half the area of the front plate 2. These features ensure a very rapid and unchanged temperature transfer from the front plate 2 to the temperature sensor 6 and also allow the thermostat to have a very flat design.

As shown in FIG. 2, the room temperature regulator is held in the closure frame 4 with the aid of hook-shaped projections 16 (only one shown) resiliently attached to the housing 1. The closure frame 4 may be secured to the junction box 15 by means of screws 18 (only one shown). The securing of the room temperature regulator to the wall subsequent to making the electrical connections to the terminal posts 12 and 12' may be effected simply by snapping the projections 16 behind the closure frame 4. It is to be understood, however, that the thermostat may be secured to a wall by any other means. Thus, for example, the device may be mounted by means of securing screws which at appropriate locations penetrate the housing 1 and are accessible subsequent to loosening and removing the frontal plate 2. In this type of securing, a closure frame or a further intermediate frame may also find application.

In the preferred embodiment illustrated in the figures the housing portion which contains the electric switch is thus dimensioned in such a manner that it fits into the junction box 15. As a result, only that part of the housing 1 projects forwardly from the wall face that contains the front plate 2 and the bimetallic temperature sensor 6. In this manner an aesthetically pleasing appearance of the wall-mounted thermostat is ensured.

It is feasible, however, to utilize the thermostat designed according to the invention in an environment other than room temperature control. In such a case it is expedient to make the front plate of an insulating material and to fixedly attach it to the housing only at some of the sides, leaving the others open. This may be done, for example, by providing the front plate with at least one downwardly bent edge by which it is connected to the housing partition. The operating member (such as a knob) of the temperature setting device is disposed on the front plate (constituting a front wall of the housing). In this manner the bimetallic temperature sensor 6 and the spring 9 are reliably protected from accidental contact or damage. Such a thermostat may be marketed independently and may subsequently be built into a larger apparatus to form a part thereof. In such a thermostat structure the air, the temperature of which is to be sensed by the bimetallic temperature sensor, is admitted laterally to the sensor through the open sides of the thermostat. The frontal wall of the housing may carry an excursion limiting screw for the temperature sensor 6 formed similarly to the setscrew 14.

It will be understood that the above description of the present invention is susceptible to various modifications, changes and adaptations, and the same are intended to be comprehended within the meaning and range of equivalents of the appended claims.

We claim:

1. In a thermostat having a housing, a bimetallic temperature sensor disposed in the housing, a device connected with the bimetallic temperature sensor for setting a desired temperature value, an electric switch disposed in the housing and an arrangement operatively connecting the bimetallic temperature sensor to the switch for actuating the latter by the former, the improvement comprising a front plate constituting a frontal wall of said housing, said front plate being made of a highly heat conducting material, said bimetallic temperature sensor being situated spaced from and in the close vicinity of said front plate.

2. A thermostat as defined in claim 1, wherein said bimetallic temperature sensor is formed of a large-surface bimetallic strip extending substantially parallel to said front plate.

3. A thermostat as defined in claim 2, wherein the area of said bimetallic temperature sensor is approximately one half the area of said front plate.

4. A thermostat as defined in claim 1, including means for removably attaching said front plate to said housing.

5. A thermostat as defined in claim 4, wherein said means for removably attaching said front plate to said housing includes oppositely disposed openings in said housing into which said front plate projects.

6. A thermostat as defined in claim 1, including an operating knob forming part of the desired temperature setting device, said knob is disposed adjacent said front plate externally of said housing and means defining an opening in said front plate for said operating knob.

7. A thermostat as defined in claim 1, wherein the material of said front plate is a metal of high heat conducting properties.

8. A thermostat as defined in claim 7, wherein said front plate is made of a thin metal sheet.

9. A thermostat as defined in claim 7, wherein said metal is aluminum.

10. A thermostat as defined in claim 1, wherein said housing includes a closed rear wall; said electric switch includes at least one terminal post supported in said rear wall and projecting therefrom outwardly of said housing.

11. A thermostat as defined in claim 1, wherein said housing has a portion containing said electric switch; said portion of said housing is dimensioned to be fitted into a junction box.

12. In a thermostat having a housing, a bimetallic temperature sensor disposed in the housing, a device connected with the bimetallic temperature sensor for setting a desired temperature value; an electric switch disposed in the housing and an arrangement operatively connecting the bimetallic temperature sensor to the switch for actuating the latter by the former, the improvement comprising in combination: a front wall forming part of said housing; a partition extending within said housing spaced from and substantially parallel to said front wall, said partition separating said bimetallic temperature sensor from said electric switch, said device for setting a desired temperature value is disposed at the same side of said partition as said bimetallic temperature sensor; a closure frame surrounding said housing and affixed to a wall; and resilient projections affixed to the outside of said housing and engaging said closure frame for securing said housing and said closure frame to one another.

13. A thermostat as defined in claim 12, wherein said arrangement includes a mechanical means connecting said bimetallic temperature sensor with said electric switch; said partition includes means defining an opening through which said mechanical means passes.

* * * * *